United States Patent Office.

WILLIAM H. HARRIS, OF CORRY, PENNSYLVANIA.

Letters Patent No. 62,328, dated February 26, 1867.

IMPROVED HAIR RESTORATIVE.

*The Schedule referred to in these Letters Patent and making part of the same.*

TO ALL WHOM IT MAY CONCERN:

Be it known that I, WILLIAM H. HARRIS, of Corry, in the county of Erie, State of Pennsylvania, have originated and invented a new Composition of Matter and Medicine for Preserving and Restoring the Human Hair, of which the following is a full and exact description of its component parts and mode of compounding, to wit:

1. One quart of pure water.
2. One gill of bay rum.
3. One gill of alcohol.
4. One half ounce of capsicum tincture.
5. One half ounce of tincture of cantharides, (Spanish fly.)
6. One half ounce of glycerine.
7. Four ounces of grape-vine juice.
8. One half ounce burnt sugar.
9. Ten drops of oil egg.
10. Sulphate of cadmium, thirty grains.
11. Lac sulphur, one drachm.

The above ingredients all to be compounded or mixed together, the sulphate of cadmium to be added last of all. Care should be taken to have all the ingredients pure.

What I claim as my invention, and desire to secure by Letters Patent, is—

The compound within described, when the same is compounded in the proportions described for the purposes set forth.

W. H. HARRIS.

Witnesses:
    A. B. RICHMOND,
    B. R. DEVOE.